June 9, 1964  J. G. BAUER ET AL  3,136,040
INSERTION AND WITHDRAWAL TOOL
Filed April 21, 1961  3 Sheets-Sheet 1
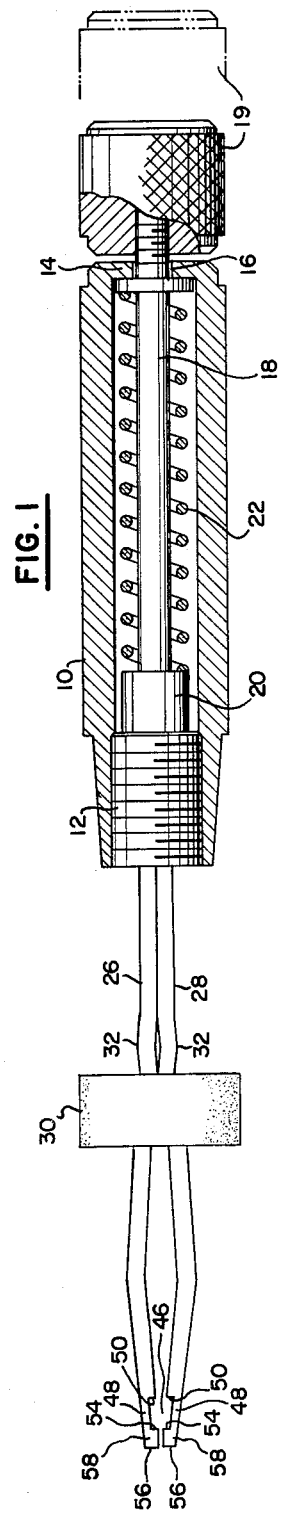
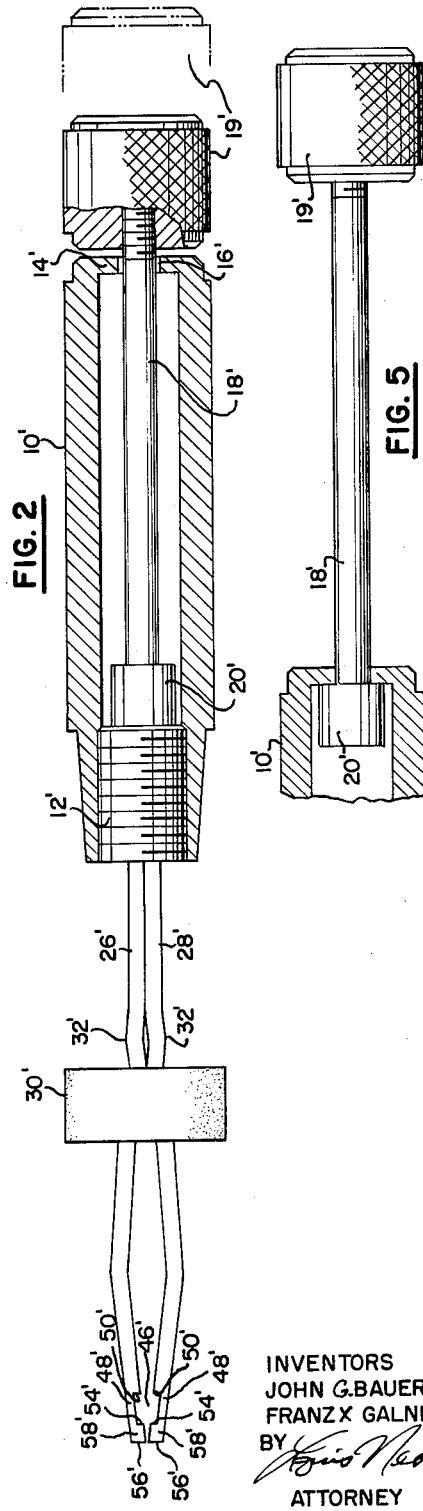
INVENTORS
JOHN G. BAUER
FRANZ X. GALNEDER
BY
ATTORNEY June 9, 1964   J. G. BAUER ET AL   3,136,040
INSERTION AND WITHDRAWAL TOOL
Filed April 21, 1961   3 Sheets-Sheet 2

INVENTORS
JOHN G. BAUER
FRANZ X. GALNEDER
BY
ATTORNEY

June 9, 1964   J. G. BAUER ET AL   3,136,040
INSERTION AND WITHDRAWAL TOOL
Filed April 21, 1961   3 Sheets-Sheet 3
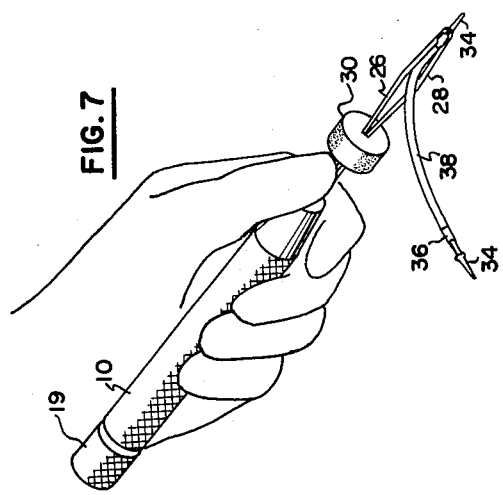
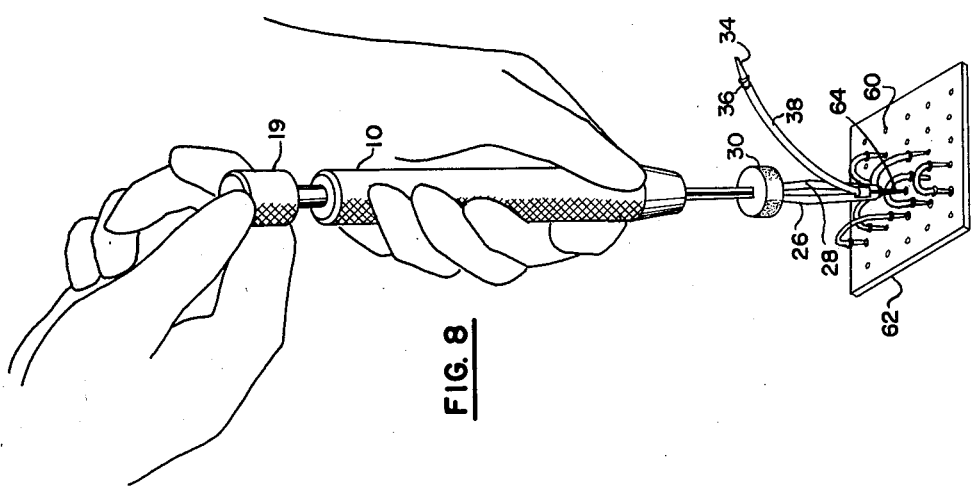
INVENTORS
JOHN G. BAUER
FRANZ X. GALNEDER
BY
ATTORNEY United States Patent Office 3,136,040
Patented June 9, 1964

3,136,040
INSERTION AND WITHDRAWAL TOOL
John G. Bauer and Franz X. Galneder, Philadelphia, Pa., assignors to Navigation Computer Corporation, Norristown, Pa.
Filed Apr. 21, 1961, Ser. No. 104,586
1 Claim. (Cl. 29—203)

This invention relates to an insertion tool of the type disclosed in Patent No. 2,960,864, issued to Watts, Nov. 22, 1960.

One object of the invention is to produce an improved insertion tool of the type set forth.

The tool disclosed in said Watts patent is used for inserting wired tapered pins into wired holes in a connecting block and includes a head 3 having a longitudinal slot 7 for receiving a portion of the tapered pin and edges or faces 9 and 11 for engaging a driving bead 13 or a pulling shoulder 15 on the pin to drive the pin into, or to pull the pin out of, a hole. To use the tool of the Watts patent, it is necessary to move the tapered pin, or the tool, laterally, or sideways towards each other so as to cause the portion of the pin between bead 13 and shoulder 15 to seat in slot 7. If the size of slot 7 is such as to tightly engage and firmly hold the pin, the insertion of the pin into slot 7 will become correspondingly difficult. Conversely, if slot 7 is sufficiently large to permit easy and rapid insertion of the pin thereinto, the pin will be loose. This means that unless the pin is otherwise firmly held in position relative to the tool, the pin can drop out. But, even if the pin did not drop out, its axis may tilt relative to the axis of the hole into which it is being driven so that the pin will be angularly, instead of coaxially, related to its hole and to adjacent pins. If sufficient care is exercised to insure coaxial insertion of each pin into its hole, the cost of the operation will be materially, if not prohibitively increased.

Furthermore, if it is desired to remove a pin which is closely surrounded, on all sides, by other pins, it will be impossible, for lack of room, to present the head 3 of a tool constructed according to the Watts patent laterally, or sideways, to the pin. In other words, the lateral engagement of the tool with the pin is only practical for removing peripheral pins which are not surrounded on all sides by other closely packed pins.

It is therefore a further object of the invention to produce an improved insertion tool in which the pin is easily and quickly engaged with the tool; in which the pin is firmly gripped over a substantial portion of its length so that it will not tilt while it is being inserted, and whereby the tool is engageable by movement in the direction of the axis of the pin whereby the tool can be easily and quickly engaged with a pin which is surrounded, on all sides, by closely packed pins.

The full nature of the invention will be understood from the following specification and the accompanying drawings in which:

FIG. 1 is a view, partly in elevation and partly in vertical cross-section, showing a spring-loaded tool embodying the invention, with the pin grasping jaws of the tool almost closed, or in substantially pin grasping position.

FIG. 2 is similar to FIG. 1, but showing an embodiment which, except for not being spring-loaded, is the same as the embodiment shown in FIG. 1.

FIG. 5 is a view showing the right-hand portion of the tool of FIG. 2, illustrating the manner in which the embodiment of FIG. 2 is used.

FIG. 7 is a perspective view showing how the pin is grasped by the tool preparatory to insertion into a hole in a connecting block.

FIG. 8 is a perspective view showing how the pin is driven into a hole in the connecting block.

Figure 3:
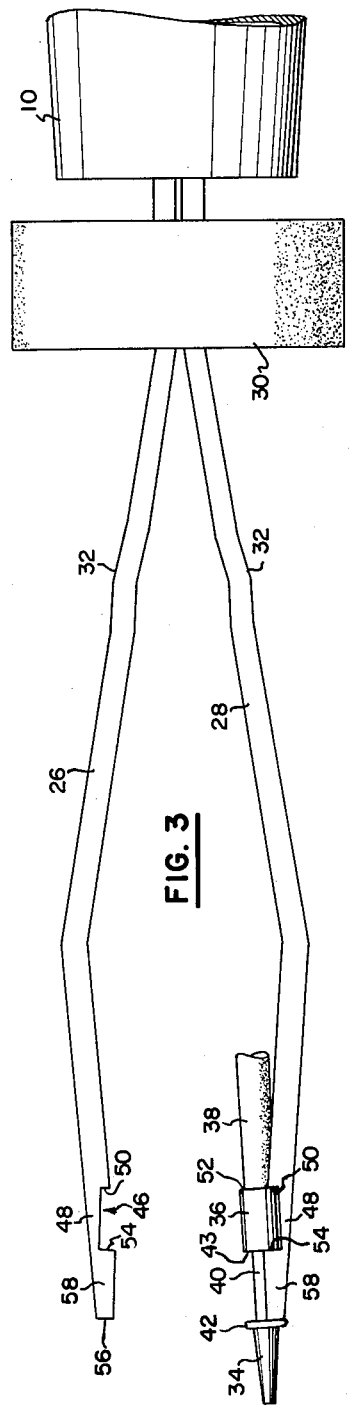
FIG. 3 is an elevational enlargement of the left-hand portion of the tool shown in FIGS. 1 and 2, the jaws being shown open and a tapered pin being shown resting on one of the jaws.

In the embodiment of FIG. 1, the tapered pin insertion and withdrawal tool illustrated includes a hollow, open-ended shank 10, one end of which is internally threaded to receive an externally threaded plug 12. The other end of shank 10 is closed by end wall 14 which is provided with an opening 16 for free reciprocation of plunger rod 18 which carries operating handle 19 and impact head 20.

Impact head 20 is biased against plug 12 by spring 22 which, upon being compressed and released, causes head 20 to strike plug 12 with a force which is a function of the loading of the spring under control of such control as is exerted by the operator. It will be understood that if handle 19 is always pulled out as far as it will go, and then released, spring 22 will be fully loaded each time and will cause head 20 to strike plug 12 with a substantially uniform force to insure uniform insertion of the pins in the holes in the block.

Figure 4:
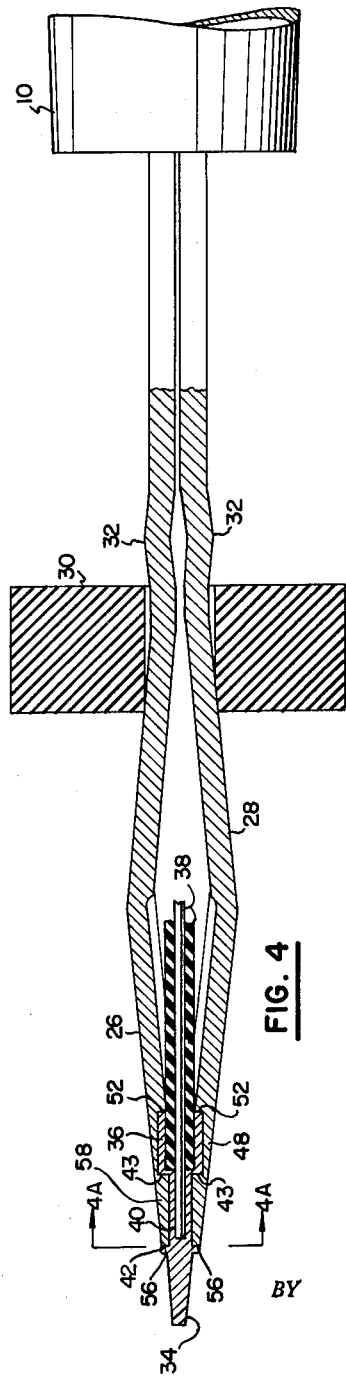
FIG. 4 is a view, partly in section and partly in elevation, illustrating the manner in which the tool grasps the pin to be inserted or pulled out.

Plug 12 rigidly carries resilient arms 26 and 28 which are sprung so that, when unrestrained, they move apart as exaggeratedly shown in FIG. 3 but which, when brought together, form a gripping jaw, as shown in FIGS. 1 and 4. Arms 26 and 28 are brought to and maintained in their jaw-forming position by a movable confining collar 30 which is rigid enough to withstand the tendency of said arms to spring apart and which has a sufficiently high coefficient of friction so that it will remain in whatever jaw closing position to which it is moved when the tool is in use, as shown, for example, in FIGS. 4, 7 and 8. Further to insure against spontaneous movement of the collar from the position of FIG. 4 to the position of FIG. 3, arms 26 and 28 are slightly bowed outwardly, as at 32.

Figure 6:
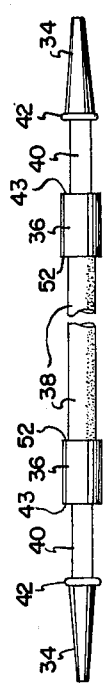
FIG. 6 is an enlarged view showing the pin which is inserted, or pulled out, by a tool embodying the invention.

As shown in FIG. 6, the pin to be inserted or removed includes a tapered shank 34, an inner, generally cylindrical portion 36 which is clamped about one end of a conductor 38, and an intermediate portion 40 of a reduced diameter which lies between driving bead 42 and the outer edge 43 of cylindrical portion 36. The pin structure forms no part of the invention except to the extent to which its parts coact with the parts of the tool.

Figure 4A:
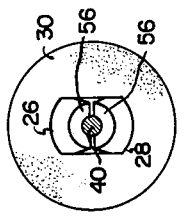
FIG. 4A is a diagrammatic, non-scale, sectional view looking in the direction of line 4A—4A on FIG. 4.

In order to accommodate the pin, the outer portions of arms 26 and 28 are cut away, as at 46 (FIG. 3), and are machined to produce reduced cross-section portions 48 to accommodate the relatively thick cylindrical portion 36 of the pin therebetween. Cutting and machining portions 48 produces inner edges 50 which are adapted to abut the inner edge 52 of cylindrical portion 36 of the pin and outer edges 54 which are adapted to abut the outer edge 43 of cylindrical portion 36. It will be noted that the length of portions 58 of the arms, or the distance between the outer edges 56 of arms 26 and 28 and the previously described edges 54 is such as freely to receive reduced portion 40 of the pin. By this arrangement, cylindrical portion 36 of the pin will be cradled between reduced cross-section portions 48 of arms 26 and 28; reduced portion 40 of the pin will be cradled between portions 58 of said arms; the outer edges 56 of said arms will abut the inner edge or driving bead 42, and edges 54 will abut the outer edge 43 of cylindrical portion 36. It will be noted that portions 58 are transversely concaved or arcuate in cross-section, to receive and clamp reduced portion 40 of the pin, as best shown in FIG. 4A.

The tapered pins, for the insertion and withdrawal of which the tool has been designed, are adapted to be inserted into corresponding electrically wired holes or sockets 60 in a connecting block 62, as shown in FIG. 8. The pins are very small, and sockets 60 are very close together so that when pins are driven four or more deep, the peripheral pins will be readily accessible to a tool constructed according to the Watts patent, but the center pin will not be accessible because there is no room to permit lateral approach of the head 3 of the Watts tool to the pin. Therefore, a pin such as pin 64 in FIG. 8 cannot be pulled out by the tool of Watts. Likewise, if it is desired to insert a pin in a central opening after other pins have been inserted all around it, the tool disclosed in the Watts patent will not do because there is no room for disengaging the tool from the pin by laterally moving the tool away from the inserted pin.

The operation of the embodiment of FIG. 1 is as follows:

With collar 30 retracted approximately as shown in FIG. 3, a pin is positioned on the end portion of one of said arms with the outer edges 56 of the arms abutting the inner side of driving bead 42; with reduced portion 40 of the pin resting on end portion 58 of said arm; with cylindrical portion 36 of the pin resting on reduced portion 48, and with the outer edge 43 of cylindrical portion 36 abutting the inner edge 54 of portion 58 and with inner edge 52 of cylindrical portion 36 abutting 50 of portion 48. The operator, using the thumb and index finger, now pushes collar 30 to the left, as viewed in the drawing, or to the position of FIG. 4 in which reduced portion 40 of the pin is tightly gripped over the entire length by jaws 58, and in which cylindrical portion 36 is gripped over its entire length by reduced portions 48. By this arrangement, the pin cannot fall out of the tool and it cannot tilt while it is being inserted, as shown in FIG. 8. With the parts in the position of FIG. 8, the operator pulls handle 19 outwardly to load spring 22 so that, upon release of the handle, the spring causes head 20 to strike plug 12 with a predetermined and substantially uniform force. The force thus exerted is transmitted through edges 56 of the arms to driving bead 42 to force the pin into its hole. To withdraw a pin, it is merely necessary to bring the ends of arms 26 and 28 close enough together to pass between adjacent pins; to move the tool downwardly onto the pin to be withdrawn and to move collar 30 to its gripping position. With the pin thus gripped, the tool is pulled straight so as to pull out the selected pin without getting entangled with the wires of adjacent pins. It will be noted that the pin insertion force is exerted by the action of edges 56 of the arms on driving bead 42 of the pin and that the pin pulling force is exerted by the action of edges 54 of portions 58 against the outer edge 43 of cylindrical portion 36 of the pin and by the gripping engagement of reduced portions 48 by said cylindrical portion 36.

Except for omitting spring 22, embodiment of FIG. 2 is the same as that of FIG. 1, and therefore the parts of the embodiment of FIG. 2 have been designated by the prime of the reference numerals which designate the same parts of the embodiment of FIG. 1.

The operation of the embodiment of FIG. 2 is as follows:

To insert a pin, plunger 18' is manually reciprocated to cause head 20' to strike plug 12'. To pull a pin out, plunger 18' is reciprocated to cause head 20' to strike against end wall 14'. The use of the tool of FIG. 2 is advantageous in dislodging a pin from its hole in that the impact on end wall 14' loosens the pin and permits its removal gently and without any "over shoot" which could cause damage to the equipment, or personal injury.

The spring arms 26 and 28 are made of an extremely rigid alloy so that the ends of the jaws may be made very small for convenient insertion between closely packed pins where the distance between one pin and the next is of the order of ⅛ inch, more or less, without fracturing, chipping, or without permanent distortion under the impact necessary to drive the pins, which in practice can be of the order of 18 pounds, p.s.i., or more.

What we claim is:

A tool for inserting a pin into a hole, said pin having:
an outer, hole-engaging shank portion,
an inner shank portion adapted to be clamped about a flexible conductor,
an intermediate shank portion, and
a driving bead between said outer and intermediate portions, said tool including:
a pair of resilient, normally diverging jaws having concaved end portions for receiving and clamping said intermediate shank portion with the outer edges of said first end portions abutting said bead,
said jaws further including inner, oppositely, transversely concaved portions for receiving and clamping said inner shank portion,
said inner portions being recessed to provide edges which engage the ends of said inner shank portion to prevent longitudinal movement thereof,
means for bringing said jaws together into clamping relation, and
means for applying a measured impact against said bead through said jaws.

References Cited in the file of this patent

UNITED STATES PATENTS

| | | |
|---|---|---|
| 1,521,689 | King | Jan. 6, 1925 |
| 1,992,596 | Bangel | Feb. 26, 1935 |
| 2,042,891 | Gailey | June 2, 1936 |
| 2,475,936 | Allen | July 12, 1949 |
| 2,548,773 | Chivelstein | Apr. 10, 1951 |
| 2,667,094 | Potter | Jan. 26, 1954 |
| 2,779,089 | Allen | Jan. 29, 1957 |
| 2,960,864 | Watts | Nov. 22, 1960 |

FOREIGN PATENTS

| | | |
|---|---|---|
| 1,197,382 | France | June 1, 1959 |